May 14, 1946.  R. G. LE TOURNEAU ET AL  2,400,239
POWER STEERING MECHANISM FOR VEHICLES
Filed Dec. 30, 1944  3 Sheets-Sheet 1

INVENTORS
R.G. LeTourneau
R.L. Akers
BY
ATTORNEYS

May 14, 1946.   R. G. LE TOURNEAU ET AL   2,400,239
POWER STEERING MECHANISM FOR VEHICLES
Filed Dec. 30, 1944   3 Sheets-Sheet 3

INVENTORS
R. G. Le Tourneau
R. L. Akers
BY
ATTORNEYS

Patented May 14, 1946

2,400,239

UNITED STATES PATENT OFFICE 2,400,239

POWER STEERING MECHANISM FOR VEHICLES

Robert G. Le Tourneau and Richard L. Akers, Peoria, Ill., assignors to R. G. Le Tourneau, Inc., Stockton, Calif., a corporation of California Application December 30, 1944, Serial No. 570,530

12 Claims. (Cl. 180—79.4)

This invention relates to an improved power steering device for a vehicle combination comprising a tractor coupled by a draft unit to a trailer, and in particular the present invention is directed to, and it is an object to provide a novel power steering device incorporated in the draft unit and operative to cause positive steering of said tractor relative to the trailer.

A further object of this invention is to provide a power steering device, for a vehicle combination as above, comprising, as a coupling and steering assembly, a pair of members mounted together for relative rotation about an upstanding axis, means mounting one member on the tractor adjacent the rear thereof in laterally tiltable but tractor-steering relation, means securing the other member in rigid, draft relation to the trailer, and novel tractor engine actuated driving mechanism connected between said members operative to effect relative rotation thereof and resultant steering of the tractor regardless of the relative lateral tilt between the latter and said one member.

Another object of this invention is to provide a power steering device, as in the preceding paragraph, in which the driving mechanism includes a driven shaft extend lengthwise of the tractor and journaled in connection with the mounting means for said one member, relative tilting of the latter being about the shaft as an axis, another shaft mounted in connection with said one member in parallel relation thereto, meshing gears between adjacent ends of the shafts, and manually controlled driving connections actuated by said other shaft and connected between said members to relatively rotate the same, reversibly and selectively.

A still further object of the invention is to provide a coupling and power steering assembly between a tractor and trailer comprising an upstanding tubular king pin, a longitudinally extending rocking member journaled on the tractor at the rear, the king pin upstanding rigidly from the rocking member for lateral tilting movement about the axis of the rocking member, a structure mounted on and relatively turnable about the king pin, a draft element connecting said structure and the trailer in rigid relation, and tractor engine actuated driving mechanism connected between the king pin and structure operative to effect relative rotation therebetween and resultant steering of the tractor regardless of the relative lateral tilt between the latter and said king pin; said mechanism including a driven shaft extending axially into said rocking member from one end thereof, another shaft journaled axially in the king pin, meshing gears between adjacent ends of the shafts, and manually controlled driving connections actuated by said other shaft and connected between said structure and the king pin to relatively rotate the same, reversibly and selectively.

It is also an object of this invention to provide, in combination with a coupling and power steering assembly which connects a tractor and trailer in power steerable but independently lateral tiltable relation; a power winch mounted on said assembly in unitary relation, the assembly including a draft element projecting forwardly from the trailer in normally rigid relation, and the power winch being fixed relative to said draft element whereby operating cables from the power winch may lead rearwardly to cable-actuate the trailer while remaining in constant relation thereto regardless of the steering angle or lateral tilt of the tractor.

An additional object is to provide a coupling and power steering assembly, together with a unitary power winch, mounted as in the preceding paragraph, wherein both the power steering means and the power winch are driven from the tractor engine through the medium of drive connections arranged to function regardless of the relative lateral tilt between the tractor and said assembly.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
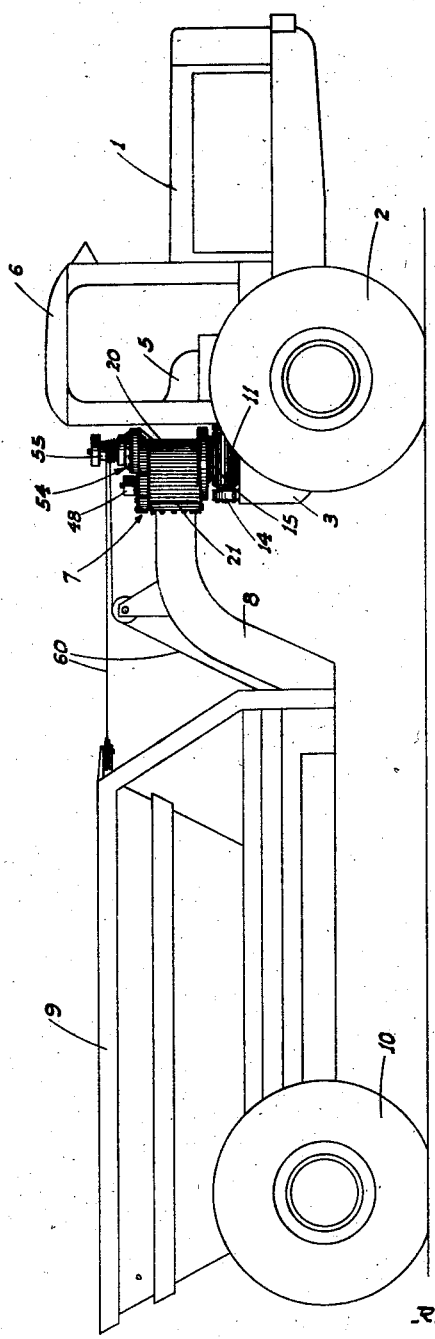
Figure 1 is a side elevation of the invention as embodied in a tractor and trailer combination.
Figure 2:
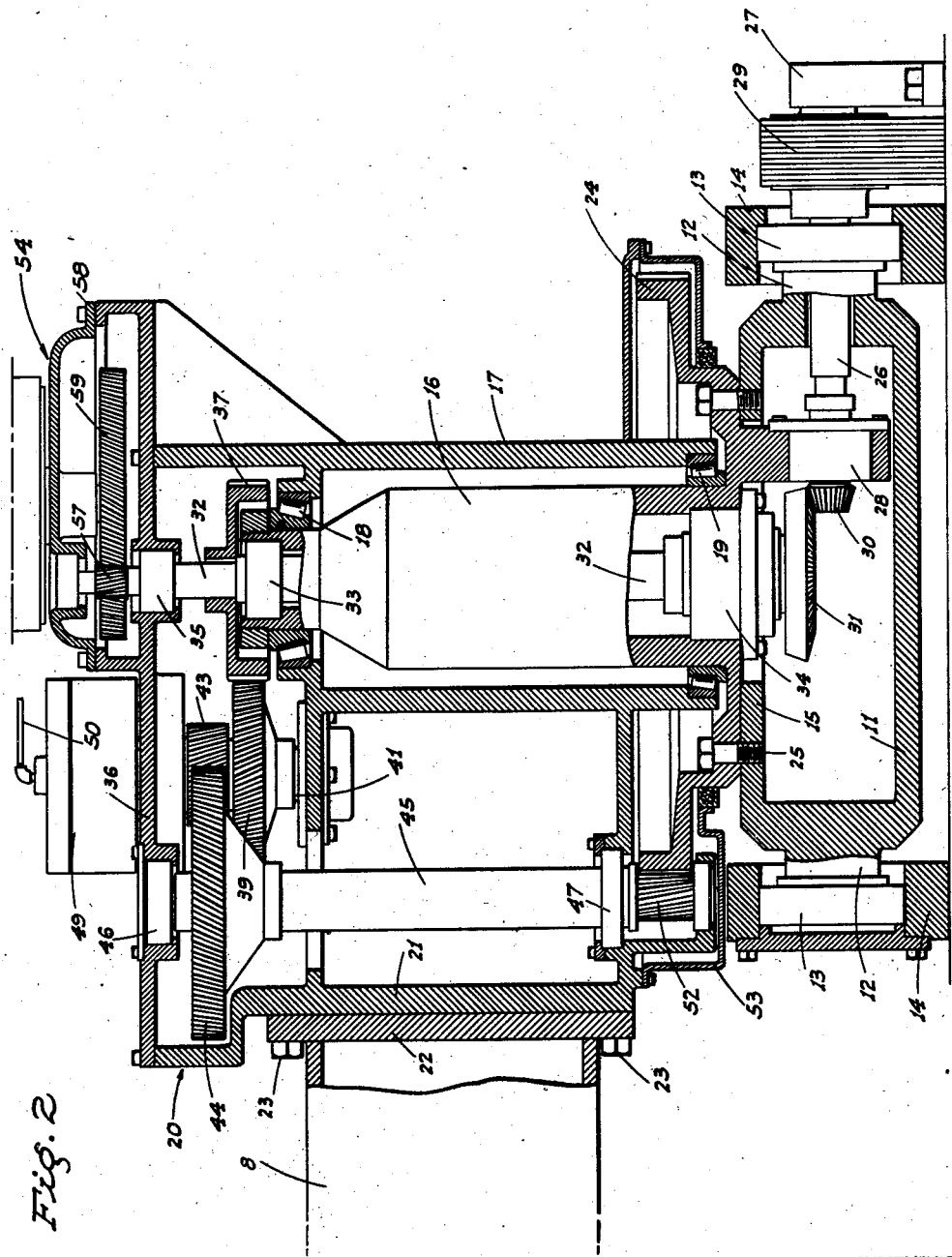
Figure 2 is an enlarged longitudinal sectional elevation of the power steering device.
Figure 3:
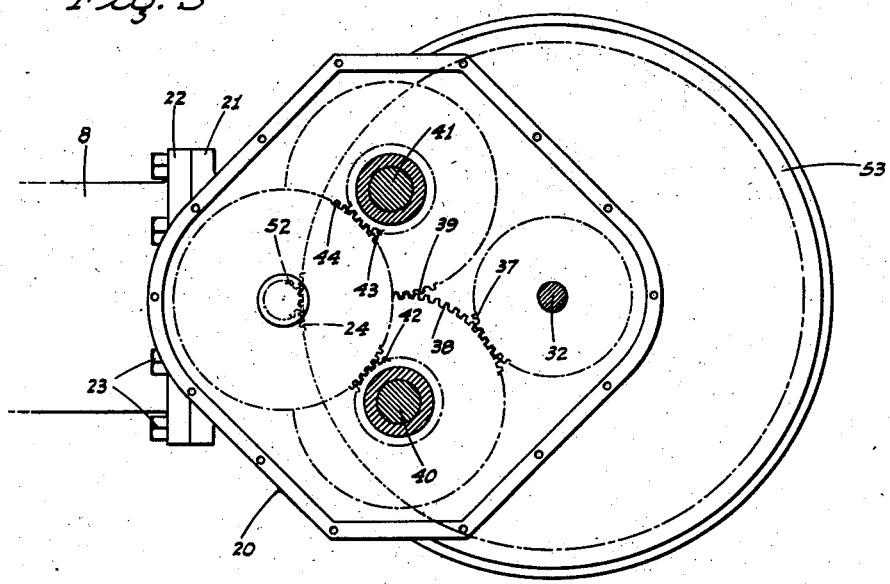
Figure 3 is a top plan view of said device, with the cover plate removed.
Figure 4:
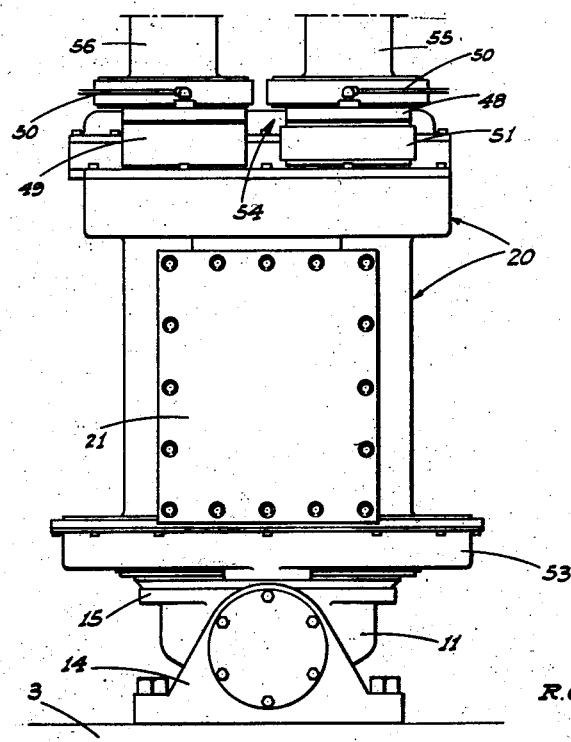
Figure 4 is a rear end view of the power steering device, detached from the trailer draft tongue.

Referring now more particularly to the characters of reference on the drawings, the device is here shown as embodied in a vehicle combination which includes a tractor, indicated generally at 1, of the "Tournapull" type; such tractor including transversely spaced ground-engaging drive wheels 2 supported by a transmission case 3 disposed therebetween, said case 3 being formed at the rear portion thereof with an upwardly facing deck 4. Ahead of the deck 4 the tractor includes an operator's seat 5 enclosed in a cab 6.

The power steering device is indicated generally at 7, being connected between the deck 4 of the tractor 1 and the front end of a rigid draft tongue 8 which projects forwardly in fixed relation from a trailer indicated generally at 9. Although the trailer is here shown as an earth carrying dump wagon including transversely spaced rear wheels 10, obviously other types of trailers may be used with the steering device which is the subject of the present invention, and which steering device comprises the following structural arrangement.

A rocking member 11 is disposed above the deck 4 of the tractor 1 and extends lengthwise of the latter in a generally horizontal plane; said rocking member being formed at opposite ends with trunnions 12 carried in bearings 13 mounted in connection with and supported by brackets 14 which are fixed to and upstand from the deck 4. The rocking member 11 is formed, in the present embodiment, as a hollow case, the top 15 of which is circular and faces upwardly.

A heavy-duty tubular king pin 16 is mounted on and upstands in rigid relation from the rocking member 11 centrally of the same, and said king pin relatively rotatably supports a heavy-duty sleeve 17 by means of top and bottom bearings, indicated at 18 and 19, respectively.

The sleeve 17 is formed in unitary relation with a housing, indicated generally at 20, which normally projects mainly to the rear of the king pin 16; said housing including a rearwardly facing back wall 21 to which the forward end of the draft tongue 8 is detachably connected by means of an attachment plate 22 held in place by cap screws 23.

An external ring gear 24 surrounds the lower end portion of the sleeve 17 in concentric relation, and is fixedly secured to the top 15 of the rocking member 11 by means of cap screws 25; said gear thus being arranged in fixed connection with the rocking member 11 and the king pin 16.

By reason of the above described arrangement, the tractor is connected in draft relation to the trailer, and said tractor is steerable relative to said trailer regardless of the relative lateral tilt therebetween as the vehicle combination traverses uneven ground; the relative steering being possible through the medium of the relatively turnable king pin 16 and sleeve 17, while the relative lateral tilting between the tractor and trailer is accomplished through the use of the rocking member 11 mounted as described.

Power steering of the tractor relative to the trailer is effected by means of the following tractor engine actuated driving mechanism:

One of the trunnions 12 is tubular and a shaft 26 projects from a bearing unit 27, upstanding from the deck outwardly of said trunnion, through the latter, and through a bearing 28 supported in the hollow rocking member 11. The shaft 26 is driven, adjacent its outer end, from a tractor engine actuated shaft (not shown) which is disposed within the transmission case 3, by means of an endless drive, indicated generally at 29. This is a constant drive.

At its inner end the shaft 26 is fitted with a bevel pinion 30 which meshes with a downwardly facing bevel gear 31 fixed on the lower end of an upstanding shaft 32 journaled axially within the king pin 16 by means of top and bottom bearings 33 and 34, respectively. At its upper end the shaft 32 projects through a bearing 35 in the top 36 of the housing 20; the shaft projecting above such top for driving engagement with a power winch, as will hereinafter appear in detail.

The upper end of the king pin 16 terminates below the top 36 of housing 20 and therebetween the shaft 32 is fitted with a gear 37. The gear 37 meshes with one of a pair of meshing gears, indicated at 38 and 39, respectively, journaled in the housing 20 generally to the rear of the king pin and sleeve assembly. The shafts 40 and 41 which carry the gears 38 and 39, and to which said gears are fixed, also carry, but in relatively rotatable relation, pinions 42 and 43, respectively; said pinions both meshing with a master gear 44 likewise disposed in the housing 20 and fixed on an upstanding shaft 45 journaled in top and bottom bearings 46 and 47.

The pinions 42 and 43 are adapted to be connected selectively in driven relation to the shafts 40 and 41 by means of fluid pressure actuated clutches 48 and 49 corresponding to said pinions; said clutches being disposed above but supported by the top 36 of housing 20. Said clutches are normally disengaged, and are adapted to be engaged upon introduction of fluid pressure conduits, indicated diagrammatically at 50, leading to the clutches for this purpose. Fluid pressure is selectively introduced to or relieved from the conduits 50 through the medium of a fluid pressure system on the tractor which includes a manually controlled valve (not shown) which is disposed adjacent the operator's seat 5. A brake unit, indicated generally at 51, is associated with one of the clutch units so as to normally maintain the corresponding pinion 42 locked against rotation, which in turn—by reason of the described gearing assembly—normally prevents rotation of the master gear 44 and the shaft 45. The brake unit 51 is releasable, by any suitable means, simultaneously with engagement of either clutch 48 or 49.

At its lower end the shaft 45 is fitted with a pinion 52 which runs in constant mesh with the gear 24; said pinion and gear being enclosed in protective relation in an annular sub-housing 53 which depends from the main housing 20.

In operation, the above described driving mechanism functions to cause steering of the tractor relative to the trailer in one direction or the other upon engagement of the clutch 48 or the clutch 49. It will be seen that as the shafts 26 and 32 are constantly rotating in one direction, the gear 37, together with the gears 38 and 39, are likewise constantly driven, but said latter gears turn in opposite directions, as is obvious. Thus, the clutches 48 and 49 provide means whereby the pinions 42 and 43 may be driven in reverse relation to each other selectively to provide a reversible drive for the gear 44 and shaft 45. Such reversible drive of the shaft 45 as imparted by the pinion 52 to the gear 24 produces relative rotation, in one direction or the other, of the king pin 16 and the housing 20 which includes sleeve 17. With such relative rotation, the leverage of the trailer is such that the king pin 16 turns within the sleeve 17, producing a steering effect on the tractor through the medium of the rocking member 11. As the shaft 26 enters the rocking member 11 axially, tilting of the king pin 16 laterally, upon relative lateral tilting between the tractor and trailer as the implement traverses uneven ground, is possible without interfering with the drive mechanism for the power steering device. With the described structure such relative lateral tilting between the tractor and trailer, together with operation of the driving mechanism for the steering device, can occur regardless of the steering angle between the tractor and trailer.

A power winch is mounted on the power steering device in the following manner:

The top 36 of the housing 20 supports, ahead of the clutches 48 and 49, a power winch, indicated generally at 54, which includes a pair of upstanding cable drums 55 and 56. Said power winch 54 is driven from the upper end of constantly rotating shaft 32 by means of a pinion 57 fixed on said shaft above the top 36 and within the base 58 of said power winch. The pinion 57 drives a gear assembly, one gear of which is shown at 59, and from which gear assembly the drums 55 and 56 are arranged to be selectively driven. The drums 55 and 56 are normally brake-locked and are adapted to be released and engaged in driven relation with the gear assembly by manually controlled means (not shown). The detailed structure of the power winch, its drive and controls form no part of the present invention, although the embodiment, broadly, of a power winch, in combination with a power steering device of the type described, is claimed as a feature of the instant invention. The advantage of a power winch so mounted is as follows:

The trailing implement of a vehicle such as here shown frequently includes cable actuated parts, and in the present embodiment the earth-carrying dumping wagon includes a pair of cables 60, one of which advances the body of the trailer, and the other of which retracts said body. With the power winch 54 mounted as a unitary part of the steering device, and on the housing 20 in fixed relation to the draft tongue 8 and the trailer, the result is that the cables 60 are always in line, regardless of the steering angle or relative tilt of the tractor, which eliminates the need of fair-lead sheaves, as conventionally used when the power winch is mounted on and movable with the tractor.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, and tractor engine actuated driving mechanism connected between said members operative to cause relative and reversible rotation therebetween regardless of the lateral tilt of the tractor relative to the trailer; said driving mechanism including a drive shaft about the axis of which said other member pivots upon lateral tilting thereof.

2. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, and tractor engine actuated driving mechanism connected between said members operative to cause relative and reversible rotation therebetween regardless of the lateral tilt of the tractor relative to the trailer; said last named connecting means including a rocking member journaled on the tractor lengthwise thereof, and said driving mechanism including a drive shaft extending axially in said rocking member.

3. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, and tractor engine actuated driving mechanism connected between said members operative to cause relative and reversible rotation therebetween regardless of the lateral tilt of the tractor relative to the trailer; said driving mechanism including a drive shaft about the axis of which said other member pivots upon lateral tilting thereof, another shaft journaled in said other member at a right angle to said drive shaft, and meshing bevel gears fixed on adjacent portions of said shafts.

4. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, and tractor engine actuated driving mechanism connected between said members operative to cause relative and reversible rotation therebetween regardless of the lateral tilt of the tractor relative to the trailer; said last named connecting means including a rocking member journaled on the tractor lengthwise thereof, and said driving mechanism including a drive shaft journaled axially in said rocking member, and means driving said shaft.

5. A device as in claim 4 in which the shaft projects beyond one end of the rocking member; the driving means connecting with the projecting portion of the shaft.

6. A power steering device for a tractor and trailer combination, comprising an upstanding king pin, a rocking member journaled lengthwise on the tractor adjacent the rear thereof, the king pin being rigidly mounted on the rocking member for lateral tilting movement about the axis of the latter, a housing structure mounted on the king pin in relatively rotatable relation, means connecting the housing structure and trailer in rigid relation, and tractor engine actuated driving mechanism connected in part between the housing structure and king pin operative to cause relative and reversible rotation therebetween; said mechanism including a drive shaft about which the rocking member is rotatable as an axis.

7. A power steering device for a tractor and trailer combination, comprising an upstanding king pin, a rocking member journaled lengthwise on the tractor adjacent the rear thereof, the king pin being rigidly mounted on the rocking member for lateral tilting movement about the axis of the latter, a housing structure mounted on the king pin in relatively rotatable relation, means connecting the housing structure and trailer in rigid relation, and tractor engine actuated driving mechanism connected in part between the housing structure and king pin operative to cause relative and reversible rotation therebetween; said mechanism including a drive shaft about which the rocking member is rotatable as an axis, another shaft extending in turnable relation axially through the king pin, meshing bevel gears on adjacent ends of said shafts, and driving connections actuated by said other shaft connected between the housing structure and the king pin.

8. A power steering device for a tractor and trailer combination, comprising an upstanding king pin, a rocking member journaled lengthwise on the tractor adjacent the rear thereof, the king pin being rigidly mounted on the rocking member for lateral tilting movement about the axis of the latter, a housing structure mounted on the king pin in relatively rotatable relation, means connecting the housing structure and trailer in rigid relation, and tractor engine actuated driving mechanism connected in part between the housing structure and king pin operative to cause relative and reversible rotation therebetween; said mechanism including a drive shaft about which the rocking member is rotatable as an axis, another shaft extending in turnable relation axially through the king pin, meshing bevel gears on adjacent ends of said shafts, a gear fixed concentrically in connection with the king pin, a pinion journaled on the housing structure and meshing with said gear, and drive connections arranged to reversibly drive the pinion from said other shaft.

9. A power steering device for a tractor and trailer combination, comprising an upstanding king pin, a rocking member journaled lengthwise on the tractor adjacent the rear thereof, the king pin being rigidly mounted on the rocking member for lateral tilting movement about the axis of the latter, a housing structure mounted on the king pin in relatively rotatable relation, means connecting the housing structure and trailer in rigid relation, and tractor engine actuated driving mechanism connected in part between the housing structure and king pin operative to cause relative and reversible rotation therebetween; said mechanism including a drive shaft about which the rocking member is rotatable as an axis, another shaft extending in turnable relation axially through the king pin, meshing bevel gears on adjacent ends of said shafts, a gear fixed concentrically in connection with the king pin, a pinion journaled on the housing structure and meshing with said gear, a third shaft journaled in the housing structure, the pinion being fixed on said third shaft and the latter being parallel to said other shaft, a master gear on said third shaft, pinions meshing with said master gear, and means to selectively and reversibly drive said pinions from said other shaft.

10. A device as in claim 9 in which said last named means comprises a pair of meshing gears, each corresponding to one of said pinions, a clutch between each pinion and the corresponding one of said pair of meshing gears, and a separate gear on said other shaft meshing with one gear of said pair.

11. A device as in claim 9 in which said last named means comprises a pair of meshing gears, each corresponding to one of said pinions, a clutch between each pinion and the corresponding one of said pair of meshing gears, and a separate gear on said other shaft meshing with one gear of said pair; the clutches being normally disengaged, and normally engaged but releasable brake means arranged in holding relation to said master gear.

12. A coupling and power steering assembly between a tractor and trailer comprising an upstanding tubular king pin, a longitudinally extending rocking member journaled on the tractor at the rear, the king pin upstanding rigidly from the rocking member for lateral tilting movement about the axis of said member, a structure mounted on and relatively turnable about the king pin, a draft element connecting said structure and the trailer in rigid relation, and tractor engine actuated driving mechanism connected in part between the king pin and structure operative to effect relative rotation therebetween and resultant steering of the tractor regardless of the relative lateral tilt between the latter and said king pin; said mechanism including a driven shaft extending axially into said rocking member from one end thereof, another shaft journaled axially in the king pin, meshing gears between adjacent ends of the shafts, and manually controlled driving connections actuated by said other shaft and connected between said structure and the king pin to relatively rotate the same, reversibly and selectively.

ROBERT G. LE TOURNEAU.
RICHARD L. AKERS.